US006304325B1

(12) United States Patent
Hardy et al.

(10) Patent No.: US 6,304,325 B1
(45) Date of Patent: *Oct. 16, 2001

(54) VARIABLE SHEAR A. C. INTERFEROMETER

(75) Inventors: John W. Hardy, Lexington; Joseph E. Lefebvre, Burlington, both of MA (US); Chris L. Koliopoulos, Tuscon, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 05/868,951

(22) Filed: Jan. 12, 1978

(51) Int. Cl.[7] ............................. G01B 9/02; G01N 21/41; G02B 27/00
(52) U.S. Cl. .................... 356/353; 356/354; 356/361; 359/577
(58) Field of Search .................... 356/353, 354, 356/361, 363; 350/162 R; 250/578

(56) References Cited

U.S. PATENT DOCUMENTS

| 3,468,609 | * | 9/1969 | Sterrett et al. | 356/353 |
| 3,829,219 | * | 8/1974 | Wyant | 356/353 |
| 3,921,080 | * | 11/1975 | Hardy | 356/353 X |
| 4,053,773 | * | 10/1977 | Deresh et al. | 250/578 |

OTHER PUBLICATIONS

Feinleib, Julius, et al., "Wideband Adaptive Optics for Imaging" Proceedings of the Society of Photo Optical Instrumentation Engineers, vol. 75, 1976 pp. 103–108 (Copy Supplied by Applicants).*

* cited by examiner

Primary Examiner—Stephen C. Buczinski
(74) Attorney, Agent, or Firm—William C. Schubert; Glenn H. Lenzen, Jr.

(57) ABSTRACT

Variable shear A.C. interferometer based on a rotating radial grating. Light is passed through the rotating radial grating to produce multiple sidebands diffracted at various angles. These multiple sidebands produce overlapping (sheared) images of the input wavefront at a detector plane causing intensity variations proportional to the phase difference between the sheared wavefronts. An array of detectors is positioned to monitor the images on the detector plane and the outputs of each are processed to obtain the local slope of the wavefront averaged over each detector. From this data, complete wavefront slope information in one direction (X) can be obtained. By providing a second interferometer to make slope measurements in the Y direction, complete information can be obtained from which the entire input wavefront can be reconstructed.

The system provided can be used with white light extended sources, has high optical efficiency, requires only a small number of optical components and is relatively insensitive to vibration. The amount of shear can also be easily varied by translating the grating rotation axis relative to the optical

7 Claims, 2 Drawing Sheets

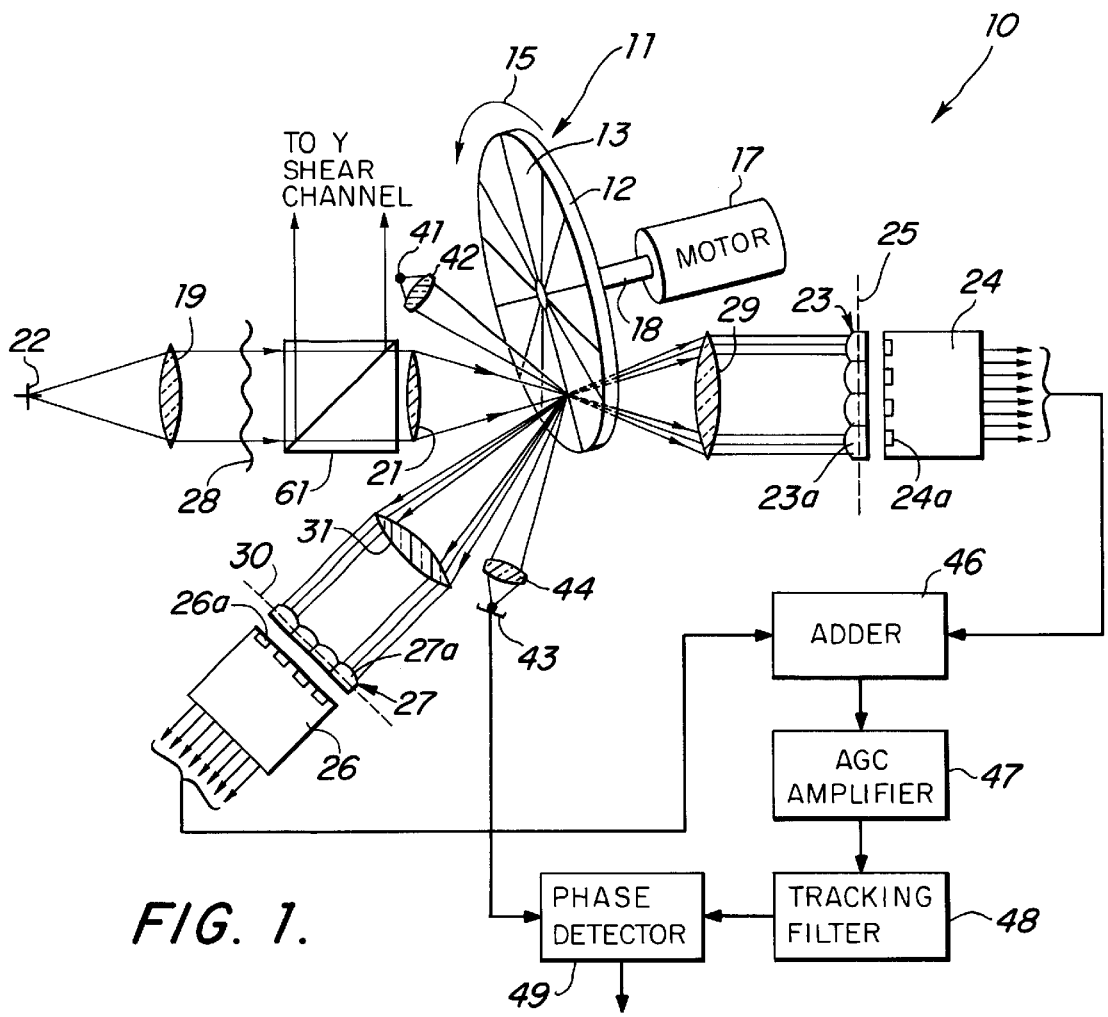
FIG. 1.
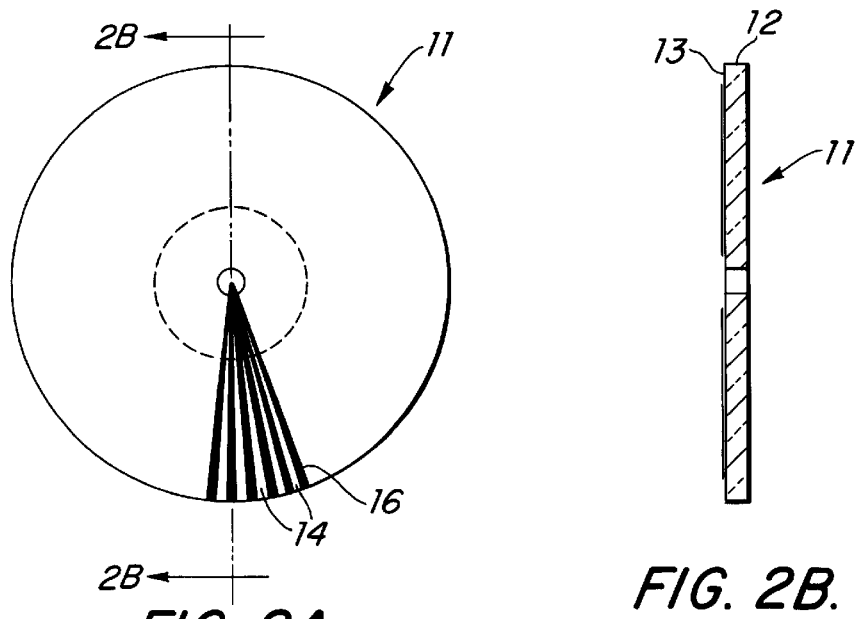
FIG. 2A.
FIG. 2B.

VARIABLE SHEAR A. C. INTERFEROMETER

BACKGROUND OF THE INVENTION

1. Field of the Invention

The present invention relates generally to the field of interferometry and more particularly, to a variable shear A.C. interferometer based on a rotating grating.

The invention herein described was made in the course of or under a contract or subcontract thereunder, (or grant) with the Department of the Air Force.

2. Description of the Prior Art

Interferometers are commonly used to measure wavefronts, and, in particular, are employed in a wide variety of applications to measure the departure of a wavefront from a true sphere (or from a plane wave in the case of collimated light). Such departures of a wavefront from its true shape typically occur as a result of imperfections in the optical path along which the wavefront travels. For example, the imperfections could be caused by a lens or some other optical system through which the light travels, and, in this situation, the interferometer could be used as an instrument to test the lens or other optical system.

In another application, the imperfections could be as a result of the effects of a turbulent atmosphere through which the light travels, and the interferometer can be employed to measure this distorted wavefront in a system to compensate for the effects of the atmosphere to permit more accurate imaging of distant objects such as a star or the like.

In general, interferometers operate by converting phase differences in the wavefront into intensity differences that can be monitored and read with a detector, and a variety of interferometers are known in the prior art. In U.S. Pat. No. 3,829,219 of James C. Wyant entitled "Shearing Interferometer," a prior art A.C. grating interferometer based on double frequency phase gratings is described. In this system, known as the Wyant Interferometer, a wavefront being observed is converged to a focal point, and two diffraction gratings having slightly different line spacings are placed near the focal point of the wavefront. The diffraction gratings produce two first diffraction orders at two slightly different angles which result in a shearing interferogram in the region of overlap. This interferogram yields wavefront information in one direction, and by shearing the wavefront in two orthogonal directions as by providing two additional diffraction gratings, orthogonally oriented relative to the first two diffraction gratings, complete wavefront information in two directions can be obtained.

The interferometer described in the above patent, as well as most other prior art shearing interferometers suffer from several inadequacies. For one thing, they are essentially designed for use with coherent light and do not operate effectively, if at all, with white light. Also, their optical efficiency is usually quite limited because in such systems the diffraction orders are spatially separated and each are sheared with the result that riot much light gets through to each of the various orders.

SUMMARY OF THE PREFERRED EMBODIMENTS

In accordance with the present invention, a variable shear A.C. (optical heterodyne) interferometer is provided which not only overcomes many of the inadequacies of the prior art, but also provides several desirable features not generally found in the prior art systems. In particular, the present invention relates to a variable shear A.C. interferometer based on the principle of a rotating radial grating which has been designed to provide the following important features:

(1) It is inherently achromatized and thus can be effectively used with white light extended sources;

(2) It has a high optical efficiency which can be made to approach 100%;

(3) The amount of shear can be easily varied by translating the grating rotation axis relative to the optical axis;

(4) It is a common path interferometer and, thus, is relatively insensitive to vibration and optical misalignment; and (5) It requires only a small number of optical components.

As will be explained in much greater detail hereinafter, light is passed through a rotating radial grating to produce multiple sidebands diffracted at various angles. These multiple sidebands produce overlapping (sheared) images of the input wavefront at a detector plane causing intensity variations proportional to the phase difference between the sheared wavefronts. An array of detectors is positioned to monitor these images, and the detector output signals are electronically processed to obtain the slope of the wavefront at every location on the wavefront where the detectors make measurements. By making two sets of phase difference (slope) measurements, X and Y, with the shear in orthogonal directions, complete wavefront information can readily be obtained.

Specific details and further features of the invention will be set out hereinafter in conjunction with the detailed description of the preferred embodiments.

BRIEF DESCRIPTION OF THE DRAWINGS

FIG. 1 schematically illustrates one channel of a variable shear A.C. interferometer according to a presently most preferred embodiment of the invention.

FIG. 2A schematically illustrates, in front view, the radial grating employed in the interferometer of FIG. 1.

FIG. 2B illustrates the radial grating of FIG. 2A in cross-section, looking in the direction of arrows 2B—2B in FIG. 2A.

DETAILED DESCRIPTION OF THE PREFERRED EMBODIMENTS

Figure 3:
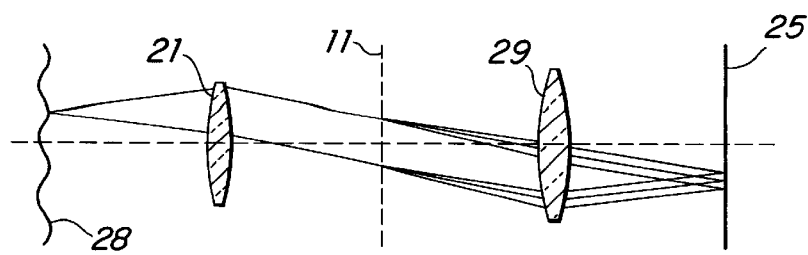
FIGS. 3–5 are provided to help explain the invention.

FIG. 1 schematically illustrates one channel of a variable shear A.C. interferometer in accordance with a presently most preferred embodiment of the invention. The interferometer is generally designated by reference number 10 and includes a rotating radial grating 11 shown in greater detail in FIGS. 2A and 2B. Specifically, the grating consists of a disc shaped substrate 12 of good optical quality glass or plastic upon one surface 13 of which is applied a number of alternating clear and reflective lines or segments 14 and 16, respectively, radially disposed and of exactly equal width at any radius on the grating.

In a system actually constructed, the substrate comprised a glass substrate 4.25 inches in diameter and 0.07 inches thick. The radial lines extended outwardly from a point 0.834 inches from the center of the disc for a length of about 2 inches. The radial lines were 450 arc seconds wide and extended completely around the disc to provide 1440 cycles/ rev. on the disc. (A cycle is one clear line and one reflective line.) Obviously, these parameters are exemplary only and could be varied within wide limits depending on the particular application for which the system is to be used and on a variety of other factors as is well understood in the art. The lines may be applied to the disc in any conventional manner as is also well-known to those skilled in the art.

Referring back to FIG. 1, grating 11 is adapted to be rotated as indicated by arrow 15 by a motor 17 axially coupled to the grating by shaft 18 at any desired rate depending upon the modulation frequency desired as will be explained hereinafter. For example, in the above embodiment wherein the system is being used to measure wavefronts, a typical rate of rotation might be 10 rps to provide a modulation frequency of 10×1440=14,400 cycles per second. The grating will produce a 50% duty cycle square wave amplitude transmittance or reflectance at any radius.

Still referring to FIG. 1, the grating 11 is positioned to intercept the optical axis of the incoming light and is located at the focus of an optical imaging system represented by lenses 19 and 21, so that an image of a reference object 22 is focused onto the grating. Because the grating is provided with alternating clear and reflective lines, light will both pass through and be reflected from the grating as it rotates. Light passing through the grating will be imaged by a lens 29 and a 2-dimensional lens array 23 (consisting of individual lenses 23a) onto a detector array 24 consisting of a 2-dimensional array of individual detectors 24a as will be further discussed hereinafter, while light reflected from the grating will be imaged onto a similar detector array 26 having detectors 26a by a lens 31 and a lens array 27 (having individual lenses 27a). The wavefront to be measured is represented by line 28. Lens 21 located in front of the grating, together with lenses 29 and 31, located after the grating, and in the paths of the beams passing therethrough and reflected therefrom, respectively, are positioned to make the lens arrays 23 and 27 conjugate with a plane at the input at which the wavefront is to be measured, i.e., at position 28.

In operation, the radial grating 11, rotated by motor 17 will produce multiple sidebands diffracted at angles |θg| where:

$$\text{Sin}|\theta g|=N\lambda f$$

where:
λ=optical wavelength
f=grating spatial frequency (a function of radius), and
N=0, ±1, ±3, ±5, etc., for a symmetrical square wave grating.

The multiple sidebands will produce overlapping (sheared) images of the input wavefront at the lens arrays 23 and 27 (i.e., on detector planes 25 and 30 aligned with the lens array) causing intensity variations proportional to the phase difference between the sheared wavefronts.

Stated differently, for a point reference source, lens 21 will form the Fourier transform of the pupil containing the path length disturbance at line 28 on grating 11. Lenses 29 and 31 then form the convolution of the pupil with the Fourier transform of the grating onto the detector planes 25 and 30 on which the lens arrays 23 and 27 are positioned. The resulting overlapping pupil images interfere with one another at the detector planes converting the wavefront phase variations into intensity variations.

Figure 4:
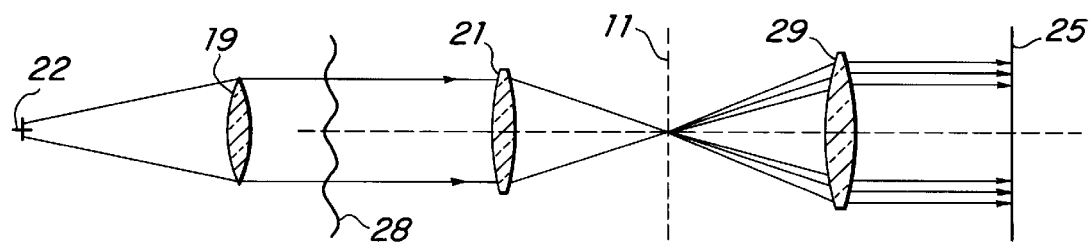
Figure 5:
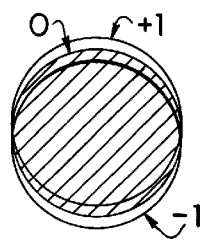

This is illustrated more clearly in FIGS. 3–5 which illustrate the light transmitted through the grating 11. (The light reflected from the grating and impinging on detector plane 30 will be affected in the same manner and need not be separately discussed.) Specifically, as illustrated in FIG. 3, the wavefront deformation at 28 is imaged onto the detector plane 25 so that each location on the detector plane will correspond to a specific zone of the wavefront. Similarly, as shown in FIG. 4, the reference object 22, focused onto the grating, produces multiple images of the input aperture at the detector plane due to diffraction. The result is lateral sheared images at the detector plane with FIG. 5 showing the 0, +1, and −1 order sidebands which produce interference over the shaded area.

Each of the individual lenses 23a in the lens array 23 collects the light impinging upon it (the light representing an image of a specific zone of the wavefront) and directs it onto the corresponding detector 24a in detector array 24 (FIG. 1). Thus, as the grating rotates, the intensity at each point on the detector plane 25 is modulated, producing an alternating current signal at the output of each of the detectors 24a in the detector array 24. If the grating is rotated at an angular velocity of $\omega_g$ radians per second, and $G_1$ is the number of complete grating cycles per revolution, then the interferogram will be modulated at a temporal frequency:

$$\omega=(N_1-N_2)G_1\omega_g \text{ radians/sec.}$$

where $N_1$ and $N_2$ are the orders of the interfering sidebands. With a symmetrical square wave grating, the only sidebands that can make $(N_1-N_2)=\pm 1$ are the 0, −1, and +1 orders. All other sidebands have a difference of at least two orders. Thus, by electrically filtering out the fundamental frequency, $\omega=G_1\omega_g$, which corresponds to the interference between the −1 and 0 diffraction orders coherently added to the interference between the +1 and 0 diffraction orders, we can insure that only the interference between the 0, −1 and +1 orders is measured and that no other diffraction orders interfere to produce the fundamental modulation frequency.

This is a significant feature of the present invention. In the prior art, e.g., the Wyant interferometer described above, the diffraction orders are optically separated and each are sheared. This is inefficient because not much light will get through to each of the orders. In the present invention, on the other hand, the orders are allowed to be superimposed and are then separated electrically. This permits much more efficient use of the available light, e.g., 80–90% or more, and also enables the use of a low frequency grating as distinguished from the high frequency grating of Wyant.

It should also be noted that the modulation frequency generated by grating motion is independent of the wavelength of the light. This permits the interferometer to be used with white light extended sources as distinguished from most prior art systems which require coherent light for effective operation.

The signal at any point on the detector planes 25 or 30 in the A.C. grating interferometer can be expressed as:

$$I(x,t) \propto \frac{1}{2} + \gamma\frac{2}{\pi}\cos(\omega t + \phi(x))$$

where:
ω=the fundamental modulation frequency;
γ=the modulation determined by the partial coherence of the reference object and the amount of path length distortion; and
ø+(x)=the phase angle of the A.C. signal.

The phase angle may be expressed as:

$$\phi(x) = \alpha(x)\frac{S}{\lambda}$$

where:
α(x)=the wavefront slope at the corresponding point in the aperture, and
S=shear distance.

The shear distance S in a grating interferometer is proportional to wavelength so that ø(x) α(x), i.e., the temporal phase angle of the signal at frequency ω is proportional to the slope of the wavefront, independent of the wavelength of light.

To reconstruct the wavefront from the local slopes measured by the shearing interferometer, the optical path differences are evaluated at an array of sampling points. As the wavefront differences approach zero or become small, the optical path difference (OPD) at two points separated by a distance L is then:

$$OPD = \phi\lambda\frac{L}{S}.$$

To provide the maximum utilization of the light collected from the reference object, the entire area of detector planes 25 and 30 are divided into contiguous zones or subapertures by lens arrays 23 and 27 with a separate detector 24a and 26a for each subaperture. The phase of the A.C. signal from each of the detectors in the detector arrays will then represent the average optical path length difference in the direction of shear over that particular subaperture. The dimension of the subaperture will be dictated by the spatial frequency of the wavefront errors to be measured and by the required precision of measurement. In one embodiment, the detector arrays 24 and 26 each consist of 16 photomultiplier tubes of the end-on type, each approximately 12 millimeters in diameter. The detector subapertures are defined by lenticular arrays of square lenses 23a and 27a which focus the light onto the corresponding detectors 24a and 26a in detector arrays 24 and 26. By designing the system in this manner such that the lens arrays lie on the detector planes with the detector arrays positioned behind them, a more reliable system is provided. Specifically, each individual lens in the lens arrays collects the light impinging upon it and directs it to the associated detector in the detector arrays. This ensures that all the light will reach the detectors even though the detectors are spaced from one another. Although, if desired, the detector arrays may be positioned on the detector planes, this would necessitate that the detectors be contiguous to ensure their receiving all the light, and this is much more difficult to construct. Thus, the construction illustrated in FIG. 1 is preferred.

To eliminate image motion, it is necessary for overall wavefront tilt to be compensated. In a shearing interferometer, measurement of overall tilt requires the use of a fixed phase reference which is obtained from the grating itself. Accordingly, in the present invention, an auxiliary optical system is employed to project a spot of light from a light emitting diode 41 onto the grating via lens 42 normally coincident with the focused light entering the wavefront sensor from the reference object. Light from the LED is modulated by rotation of the grating at the fundamental frequency ω and is detected by photodiode 43 via lens 44 to provide the X phase reference.

Any overall tilt in the incoming wavefront will cause the image of the reference object 22 to move on the grating with respect to the fixed LED reference. This causes a uniform electrical phase error to be detected in all channels proportional to the amount of wavefront tilt.

The signals from each of the detectors in the detector array 24 and 26 consists of a periodic A.C. wave at a frequency ω generated by rotation of the grating and shifted in phase according to the local wavefront slope over the corresponding detector subaperture. The signals from array 24 are then added coherently with the corresponding signals from array 26 in order to enhance the signals. This addition, which may be carried out by inverting the polarity of one input with respect to another is represented by box 46.

It should be emphasized at this point that, although the preferred embodiment illustrated in FIG. 1 employs a grating of alternating transmissive and reflective segments whereby sheared interferograms of both the reflected and transmitted light may be obtained, this is not essential. It is possible to utilize only the transmitted or the reflected light (in which cases the grating may be constructed of alternating clear and opaque or alternating reflective and opaque sections, respectively) if desired. By using both transmitted and reflected light and combining the signals from each detector array, however, enhanced signals and more reliable results are obtainable.

The enhanced signals from adder 46 then pass through an AGC amplifier 47 and a tracking filter 48 before being phase detected. The purpose of the AGC amplifier is to maintain a constant amplitude signal within a wide range of input signal intensity variations. The AGC voltage range is in the order of 70 db.

The tracking filter is a phase-locked loop (PLL) used as a band-pass tracking filter at the grating modulation frequency ω. The PLL is able to lock onto low level, carrier wave signals, even in the presence of random noise of greater amplitude than the signal; the PPL performs as an amplifier and noise filter, enhancing the system signal-to-noise ratio. The phase detector 49 used in each channel is a four-quadrant analog multiplier followed by a low pass filter. The multiplier has two inputs: (1) the filtered signal from the detector channel, and (2) the fixed phase reference signal from photodiode 43.

The filtered output of the multiplier consists of an analog voltage proportional to the instantaneous phase difference of the two inputs, which in turn is proportional to the optical path difference averaged over the corresponding detector subaperture of the wavefront.

To reconstruct the wavefront, it is necessary to make two sets of phase difference measurements, X and Y, with the shear in orthogonal directions. The X and Y phase difference measurements are then combined to reconstruct the actual wavefront. This process may be implemented using the analog processor described in U.S. Pat. No. 3,921,080 to John W. Hardy entitled "Analog Data Processor", and thus need not be described in detail herein.

The two sets of phase difference measurements are made by splitting the incident beam as shown in FIG. 1 by means of beam splitter 61 and using two interferometers with the gratings arranged so that the radial lines cut the optical axes of the X and Y interferometer channels at right angles, producing shear in two orthogonal directions. The grating frequency, and therefore, the shear, in the X and Y directions may be varied independently by moving the gratings radially with respect to the optical axes.

Figure 6:
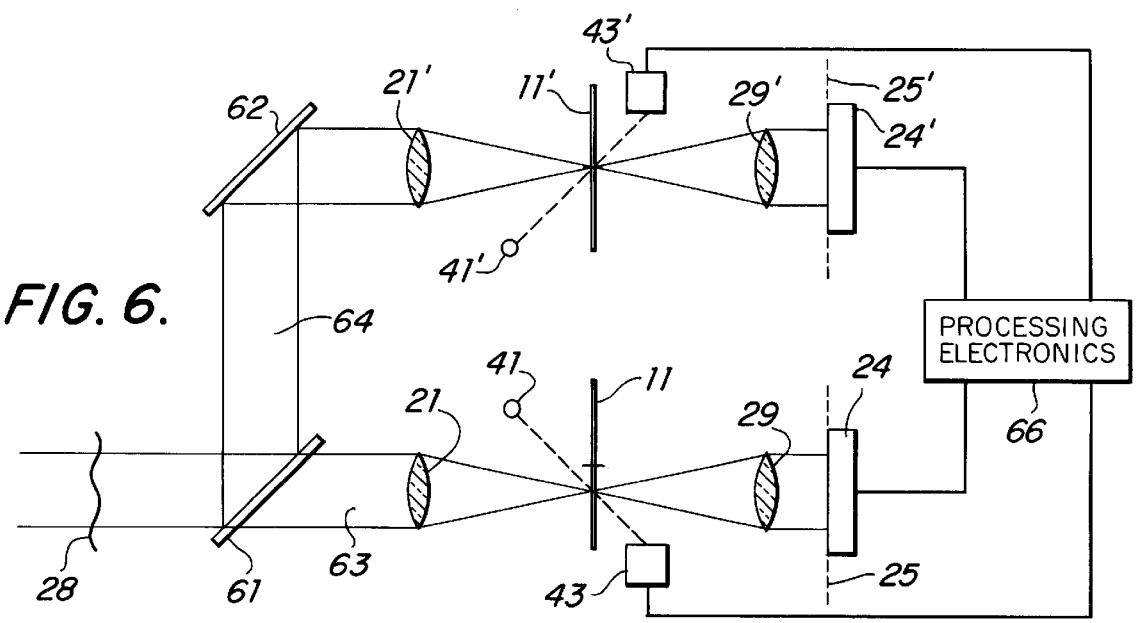
FIG. 6 illustrates, in highly schematic form, the over-all arrangement of a variable shear A.C. interferometer according to an alternative embodiment of the invention.

The overall interferometer system is very schematically illustrated in FIG. 6 for purposes of completeness. Specifically, the incoming wavefront represented by line 28 is split by beam splitter 61 into two paths 63 and 64 with path 63 corresponding to the X interferometer channel illustrated in greater detail in FIG. 1 and path 64 being directed via mirror 62 through the Y interferometer channel. Corresponding components in the X and Y channels are identified by similar reference numbers except that the Y channel components have been primed. Also, in FIG. 6, the gratings are illustrated as being of the transmissive type having alternating clear and opaque lines as distinguished from the embodiment of FIG. 1 wherein it was of alternating clear and reflective lines. This is to emphasize that either embodiment may be used in the invention.

The various components in the Y channel, namely, lenses 21' and 29', grating 11', detector array 24' and reference source and detector 41' and 43' all function as in the FIG. 1 embodiment and need not be described in detail. In FIG. 6, however, the detector arrays have been shown as being positioned on the detector planes 25 and 25', respectively, to illustrate the alternative embodiment described previously. Also, for ease in illustration, all the processing electronics has been lumped together and is represented by box 66, although it should be clear that the Y channel will have the same electronics illustrated in FIG. 1 for the X channel.

In summary, what has been disclosed is a novel A.C. lateral shearing interferometer providing substantial advantages over the prior art. The system described is versatile and efficient and can be used in a large number of applications. While what has been described are the presently most preferred embodiments of the invention, it should be understood that the invention could take many forms. For example, although the invention has been described as employing rotating radial gratings, it is possible that rotating gratings of other configurations may be employed. Gratings having logarithmic spiral lines, for example, are believed to be usable in carrying out the invention. Accordingly, it should be understood that the invention should be limited only insofar as required by the scope of the following claims.

We claim:

1. Interferometer apparatus for producing a shearing interferogram of a wavefront emanating from a reference object comprising:
   a. a rotating diffraction grating in the path of said wavefront, said diffraction grating comprising a radial diffraction grating having alternating light transmissive and lights reflective lines radially disposed and of equal width to one another at any radius;
   b. first and second detector planes;
   c. optical means including first lens means positioned in advance of said grating for focusing an image of said reference object onto said rotating diffraction grating to produce multiple images of the input aperture of said interferometer apparatus on said detector planes due to diffraction, and second lens means for imaging said wavefront onto said detector planes such that each location on said detector planes corresponds to a specific zone of said wavefront whereby overlapping sheared images of said wavefront will be produced on said detector planes which interfere causing intensity variations related to the phase difference between the sheared wavefronts, said second lens means being positioned both in advance of said grating and between said grating and said detector planes and including a transmissive second lens means for imaging said wavefront transmitted through said grating onto said first detector plane, and another transmissive second lens means for imaging said wavefront reflected from said grating onto said second detector plane; and
   d. detector means for monitoring the intensity variations at each said location on said detector planes.

2. Apparatus as recited in claim 1 wherein said detector means includes a plurality of detector means, each of said plurality of detector means being positioned to monitor a different one of said locations on said detector planes, each of said plurality of detector means including output means, whereby rotation of said grating modulates the intensity of the light on each of said plurality of detector means producing an alternating A.C. signal at the output of each of said plurality of detector means; and further including means for processing said output signals from each of said plurality of detector means for obtaining the slope of said wavefront at each said specific zone thereof.

3. Apparatus as recited in claim 2 wherein said plurality of detector means comprises a two-dimensional array of detectors.

4. Apparatus as recited in claim 3 and further including a plurality of individuals lenses arranged in a two-dimensional lens array positioned on said detector planes, each of said plurality of individual lenses being positioned at a different one of said locations on said detector planes, and wherein said detector array is positioned relative to said lens array such that the light collected by each of said plurality of individual lenses in said lens array is directed to a corresponding one of said plurality of detector means in said detector array.

5. Apparatus as recited in claim 4 wherein said lens array comprises a lenticular array of square lenses.

6. Apparatus as recited in claim 1 and further including means for coherently adding the outputs from said first and second detector means.

7. Apparatus as recited in claim 1 and further including phase reference means for allowing detection of overall wavefront tilt.

* * * * *